July 7, 1970 J. W. WEBB ET AL 3,519,108
MACHINE FOR FILLING BOTTLES
Filed July 11, 1968 2 Sheets-Sheet 1

INVENTORS
JAMES W. WEBB
ROY K. HENNIG
BY
*Harvey W. Tribbett*
ATTORNEY

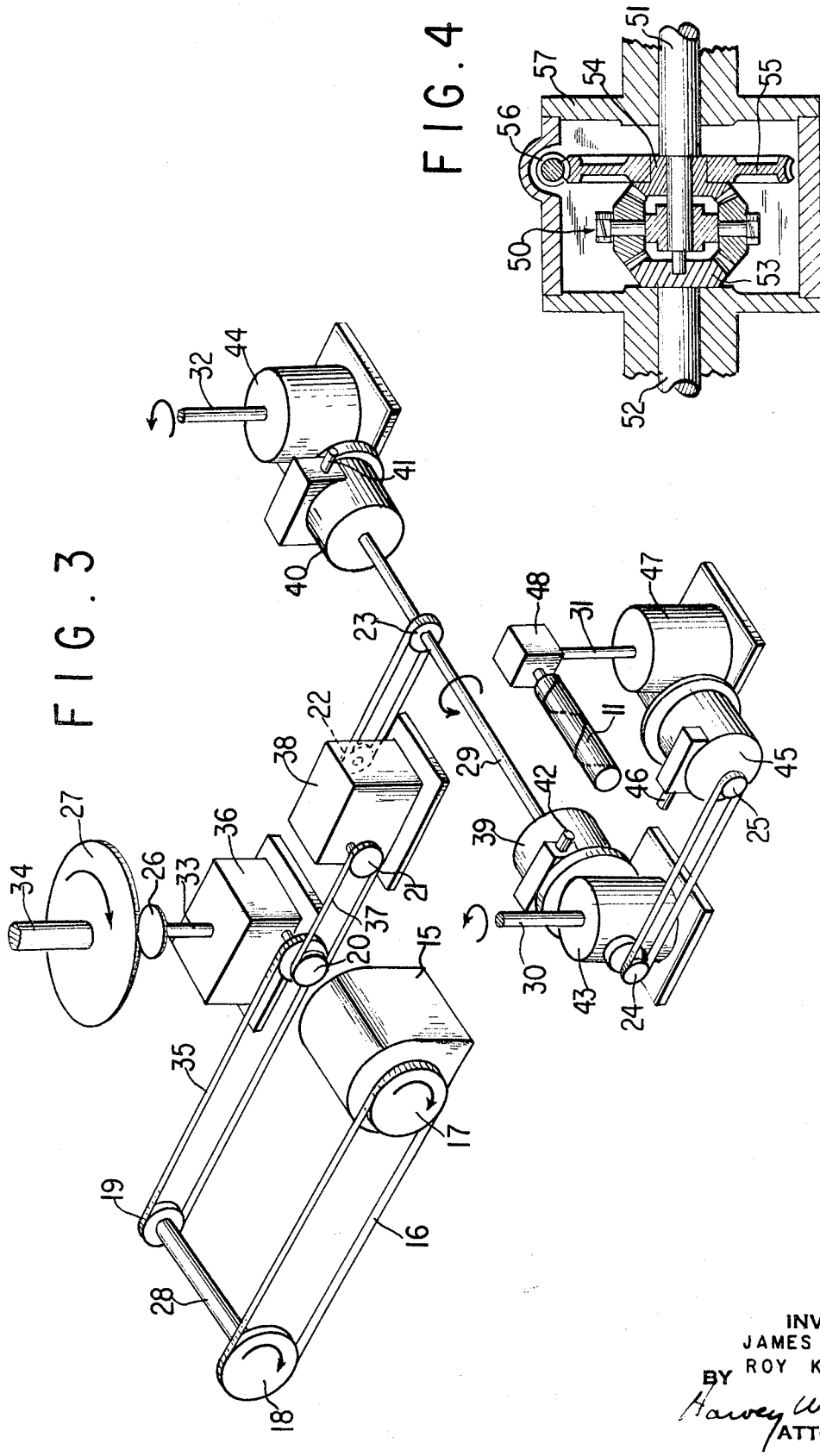

United States Patent Office 3,519,108
Patented July 7, 1970

3,519,108
MACHINE FOR FILLING BOTTLES
James W. Webb and Roy K. Hennig, Cincinnati, Ohio, assignors to Richardson-Merrell Inc., New York, N.Y., a corporation of Delaware
Filed July 11, 1968, Ser. No. 744,008
Int. Cl. B65g *37/00;* B67c *3/00*
U.S. Cl. 198—34                     1 Claim

ABSTRACT OF THE DISCLOSURE

An improvement in bottle-filling machines which have a plurality of parts which transfer bottles from one station to another while turning in synchronous relationship to each other, said rotating parts being driven by a common source of power through differential gears enabling phase adjustment of one rotating part in relationship to the other without stopping rotation of the individual members.

---

This invention relates to an improvement in machines for filling bottles.

Bottles are commonly filled with liquids in industry on a machine which includes a flat top conveyor which carries the bottles both to and from the machine, a spacing screw which engages the bottles—spacing them apart and feeding them into pockets of an infeed wheel which in turn transfers the bottles to their proper place on a rotating conveyor on which they are filled as the conveyor turns with them to spaced pockets in a discharge wheel which removes the filled bottles from the filling stations on the rotating conveyor to the top conveyor which removes them to other operations which may include capping, labeling, and so on. Many patents describe various bottle-filling machines of this type.

It is necessary that the rotation of the various parts including the feed screw, the pocketed infeed wheel, the rotary filling table, and the discharge wheel be synchronized very accurately to avoid undue breakage of the bottles and to assure smooth transfer of them to their proper position on the rotating filling table and back onto the flat top conveyor. Accordingly, synchronization of the phase of each of these rotating components in relationship to the others must be carefully made and means for turning these elements on their respective drive shafts and fixing them to the desired operating position must be provided. In some commercial operations, such as the filling of pharmaceutical solutions into bottles, the bottles of particular products are often of a slightly different size or shape and the runs between different filling operations involving different size bottles may be comparatively short. Unfortunately, it is necessary to shut down the bottle-filling operation, make the necessary adjustments by hand, and start the machine again with empty bottles to see if it is operating smoothly before the liquid can be filled into the machine in a steady operation. Invariably, several adjustments are necessary before the various parts of the machine are synchronized accurately enough to put the machine into production. In the meantime, the machine is idle insofar as production is concerned, and many workers in the plant may also be standing by while the operator of the machine makes the several adjustments that are necessary.

The present invention provides means by which the several essential elements of a conventional bottle-filling machine may be synchronized and adjusted with respect to each other and while the machine remains in operation. Not only is much valuable time saved but also the machine can be adjusted from time to time to provide smooth operation with reduced breakage of bottles and slopping of the liquid out of the bottles.

FIG. 3 is an isometric view of the essential driving and adjusting elements of the bottle-filling machine of the present invention; and FIG. 4 is a cross-sectional view in elevation of the dicerential gears which are a critical part of the machine and make it possible to make the various adjustments indicated above from time to time as may be desired.

Figure 1:
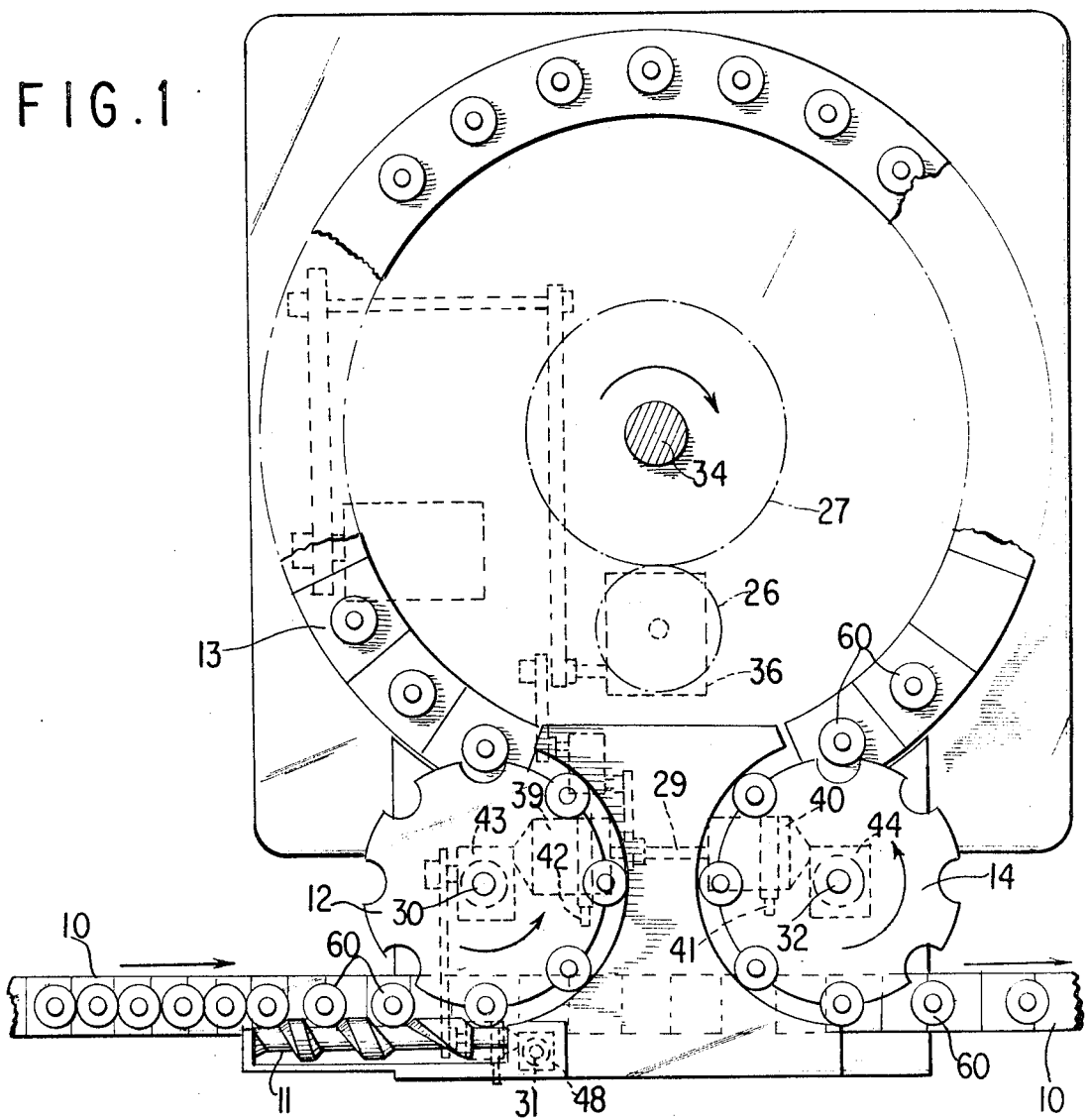
FIG. 1 is a plan view showing the essential moving parts of the present invention.
Figure 2:
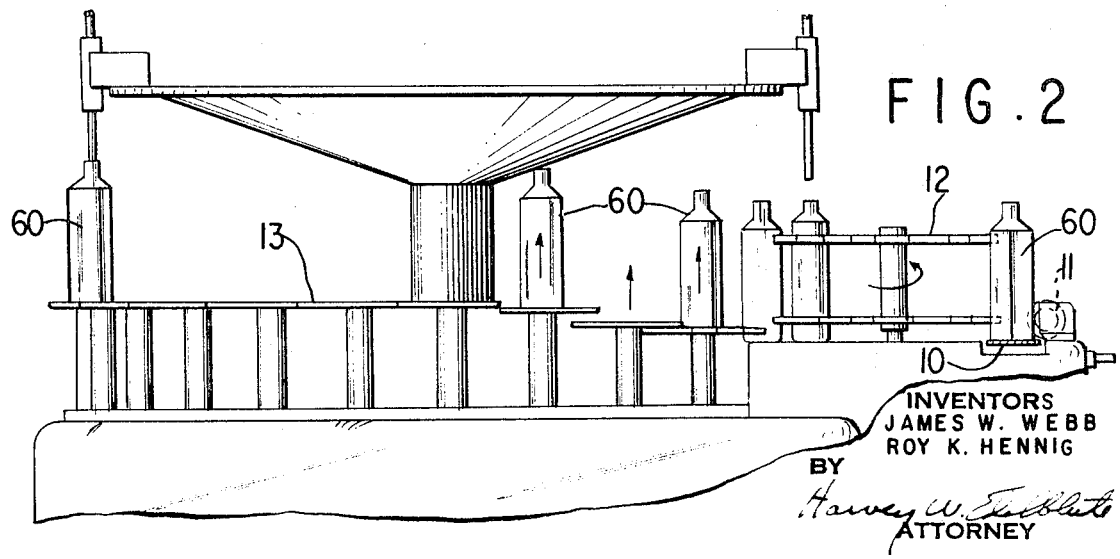
FIG. 2 is a partial view in elevation showing the bottles being fed onto the filling table.

Referring again to FIG. 1, it will be seen that the essential parts of the machine are a flat top conveyor 10, a feed screw 11, an infeed wheel 12, a circular filling table 13, and a discharge wheel 14. As indicated above, these elements are conventional.

The novel drive mechanism with the adjusting means necessary to accomplish the above purposes are shown in the isometric drawing of FIG. 3. These include a source of power 15; a variable pitch drive belt 16; drive wheels 17, 18, 19, 20, 21, 22, 23, 24, and 25; gears 26 and 27; and the necessary shafting 28, 29, 30, 31, 32, 33, and 34 properly mounted.

Power from the motor 15 is transmitted through the variable pitch drive belt 16 through a timing belt 35 to a 30:1 ratio speed reducer 36. The output from this speed reducer is transmitted through shaft 33 to shaft 34 which turns the rotary filling table by means of shaft 34. The ratio of driving members 26 and 27 may be of the order of 4:1 for satisfactory operation. Power from the motor is also transmitted through timing belt 37 to a reversing gear 38 and thence to shaft 29 which operates the differential gears 39 and 40. These 2:1 gears each have a correction shaft 41 and 42. The output drive of these differential gears operates 20:1 ratio speed reducers 43 and 44. The speed reducer 43 turns the infeed wheel 12 of FIG. 1 and speed reducer 44 turns discharge wheel 14 of FIG. 1 in the directions as indicated in the drawings. An output drive 24 from speed reducer 43 turns a third differential gear 45 which operates at a ratio of 1:2. This unit also has phase adjustment means 46. The differential gear also operates a 5:1 speed reducer 47 which through suitable shifting 31 and a 1:1 90° gear set 48 turns the infeed worm 11 of FIG. 1.

The construction of each of the differential gears or phase adjusting means 43, 44, and 47 is essentially the same as is shown in FIG. 4 in cross section. The differntial gear comprises a spider 50 with two freely turning bevel gears splined on spider shaft 51 and a side gear shaft 52 on which is mounted bevel gear 53. A worm gear 55 is mounted on bevel gear 54 which runs on spider shaft 51, and the geared end of correction shaft 56 meshes with the worm gear as shown. The correction shaft which extends from the gear box 57 is represented by each of the shafts 41, 42, and 46 in FIG. 3. It will be understood, of course, that these gears are properly mounted in the gear box 57.

As will be apparent from the drawing, and as known to those familiar with differential gears of the type illustrated, both the spider shaft and the side gear shaft rotate in the same direction and either may be used as the input to obtain a 2:1 increase or decrease. When the spider shaft is used as the input, there is a 2:1 ratio speed step-up between input and output. Conversely, when the side gear shaft is used as the input, there is a 2:1 speed reduction on the spider shaft.

As will be seen from the drawings, turning of the correction shaft will rotate the worm gear slightly and with it the attached bevel gear 54. This action turns spider shaft 51 a few degrees with, however, the side gear shaft remaining in its position. This action makes it possible to change the phase relationship of the output shaft to that of the input shaft. In the present invention, we have found that the correction shaft of worm gear ratio is preferably 70:1.

As will be seen from FIGS. 1 and 3, the feed screw 11, infeed wheel 12, filling table 13, and outfeed wheel 14 may be initially adjusted to approximate operating synchronization and the machine started up by operation of motor 15. If feed screw 11 is slightly out of phase with the pockets of infeed wheel 12 so that the bottles 60 are not fed into the pockets of infeed wheel 12 properly, turning of correction shaft 46 in either desired direction will change the phase of the feed screw 11 in relationship to the pockets of infeed wheel 12. When this operation has been performed and the bottles are feeding smoothly into the pockets of the infeed wheel, the correction shaft 46 may then be left in a fixed position. Further adjustments may then be made with respect to the relationship between infeed wheel 12 and the filling stations on the rotating filling table 13. This is done by turning correction shaft 42 while the machine is turning if desired. As will be seen, adjustments between the infeed wheel and the rotating filling platform do not affect the relationship between the feed screw 11 and the infeed wheel 12. When this adjustment has been properly made for the particular size and shape bottles that are to be filled, the relationship between outfeed wheel 14 and the filling stations on the rotary filling platform 13 may be adjusted by turning the correction shaft 41 in either direction as may be necessary to effect perfect synchronization between the pockets of outfeed wheel 14 and the filled bottles on the filling stations of rotary filling wheel 13.

The correction shafts 41, 42, and 46 may, of course, be fitted with sprocket wheels and chain drives to an appropriate panel at the front of the machine where the operator may have free access to them. Suitable locking means may also be provided to prevent turning of the shafts through vibration or by accident.

What is cliamed is:

1. The improvement in bottle-filling machines having rotating parts including a spacing and infeed screw, an infeed wheel, a filling table, and an outfeed wheel, means for rotating each of these parts in synchronism with each other through appropriate drive means, the infeed screw, the infeed wheel, and the outfeed wheel each being driven through a phase adjusting means comprising a differential gear having a spider with a pair of freely rotating bevel gears, said spider being mounted on a power shaft, a third bevel gear mounted on a second power shaft in mesh with the bevel gears on said spider, a worm gear wheel mounted on a fourth bevel gear in mesh with said bevel gears on the spider, a correction shaft with a worm gear in mesh with the worm gear wheel whereby a turn of the correction shaft will turn the said first named power shaft to a smaller degree, the differential gear through which power is transmitted to the infeed screw being operated through gear means turning the infeed wheel which gear means is operated in fixed relationship to the gear means turning the filling table and the differential gear through which power is transmitted to the gear means turning the outfeed wheel.

References Cited

UNITED STATES PATENTS

| 2,837,127 | 6/1958 | Luther | 198—104 |
|---|---|---|---|
| 2,768,656 | 10/1956 | Day et al. | |

EVON C. BLUNK, Primary Examiner

R. S. GAITHER, Assistant Examiner

U.S. Cl. X.R.

198—104; 141—129